April 16, 1957  V. OHLENKAMP  2,788,842
TRACTOR SEAT
Filed Feb. 23, 1954
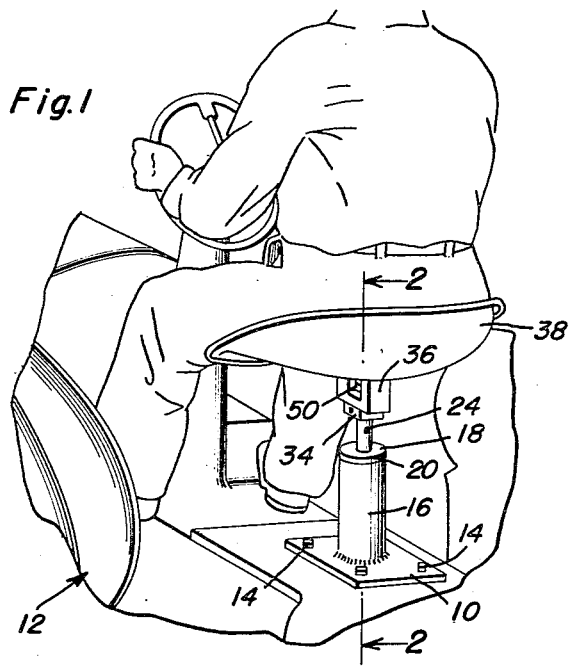
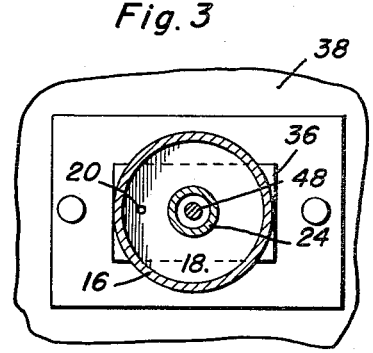
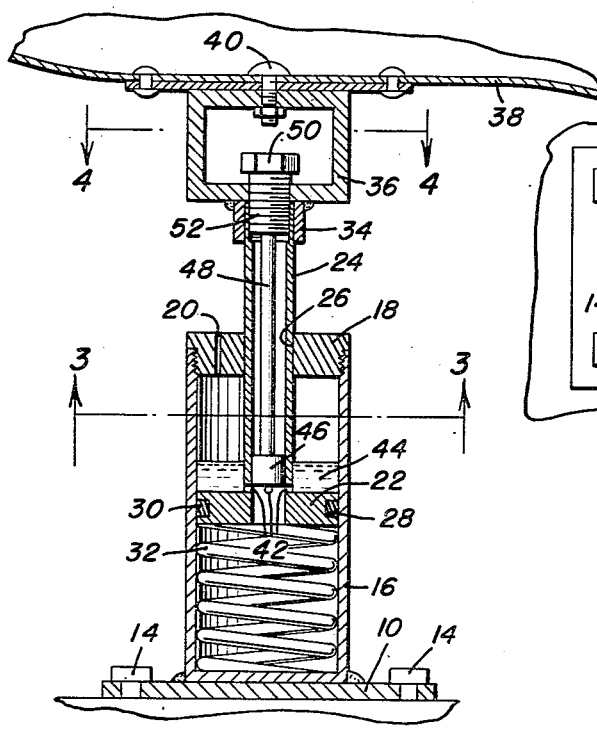
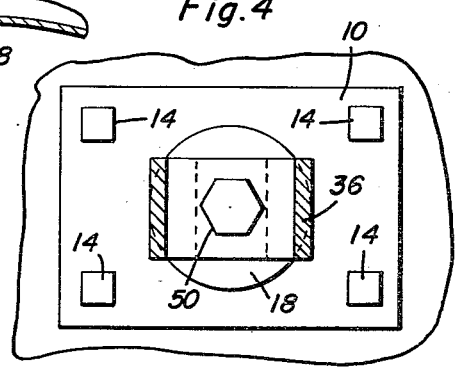
Vern Ohlenkamp
INVENTOR.
BY *Clarence A. O'Brien*
*and Harvey B. Jacobson*
Attorneys

2,788,842

TRACTOR SEAT

Vern Ohlenkamp, Lowell, Ind.

Application February 23, 1954, Serial No. 411,900

1 Claim. (Cl. 155—9)

This invention relates to a tractor seat and more particularly to a seat adapted to be mounted on a tractor wherein cushioning results will be obtained to provide the user with a smoother ride.

An object of this invention is to provide a tractor seat which is adjustable to vary the cushioning effect in accordance with the weight of the operator of the vehicle.

Another object of this invention is to provide a tractor seat having novel means therein for varying the cushioning effect of the supporting stand.

A further object of this invention is to provide a tractor seat which is simple and efficient in construction, and durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a perspective view showing the improved tractor seat forming the subject of this invention mounted in position on the rear of a tractor;

Figure 2 is a sectional view taken substantially along the section line 2—2 of Figure 1;

Figure 3 is a sectional view taken substantially along the section line 3—3 of Figure 2; and Figure 4 is a sectional view taken substantially along the section line 4—4 of Figure 2.

Referring now more particularly to the accompanying drawings it will be seen that the improved tractor seat includes, a base 10 adapted to be secured to the rear portion of a tractor 12 by means of suitable fasteners 14.

Secured to the base 10 is a vertically disposed cylinder 16 having an open upper end. A cylinder head 18 is removably secured to the upper end of the cylinder 16 and substantially closes the same. The cylinder head 18 is provided with an aperture 20 extending therethrough which forms a vent for the cylinder. Slidably disposed within the cylinder for vertical movement therein is a piston 22 having a hollow stem secured thereto and extending upwardly therefrom through an aperture 26 in the cylinder head 18. The piston 22 is provided with an annular groove 28 along the outer periphery thereof which receives a gasket 30 for sealing the piston 22 within the cylinder 16. A coil spring 32 is disposed within the cylinder 16 between the lower end thereof and the piston 22 for urging the piston 22 upwardly within the cylinder.

A collar 34 is secured to the upper end of the hollow stem 24 and a hollow bracket 36 is secured to the collar 34 by means of welding or the like. A seat body 38 is fixedly secured to the bracket 36 by means of suitable fasteners 40. Thus, when an operator sits on the seat body 38 his weight will force the piston 22 against the spring 32 and any shocks due to the vehicle passing over uneven terrain will be taken up by the spring 32.

In order to provide a cushioning effect and to limit the motion of the spring 32 the lower end of the tubular stem 24 is provided with a plurality of transverse apertures 42. The cylinder 16 is filled with a fluid 44 both above and below the piston 22.

Thus, when the piston 22 is urged downwardly within the cylinder 16 the fluid 44 therein must pass through the restricted apertures 42 which will cause a cushioning effect.

In order to provide means for varying the cushioning effect to compensate for different weights of operators, a plug valve 46 is slidably disposed within the tubular stem 24 adjacent the apertures 42. A rod 48 is connected to the plug 46 and extends upwardly therefrom. An abutment 50 is secured to the upper end of the rod 48. The abutment 50 is externally threaded as at 52 and is threadedly engaged in the upper end of the stem 24 and in the bracket 36 and extends into said bracket and whereby the plug valve 46 may be moved longitudinally within the stem 24 to vary the openings of the apertures 42. Thus, when a lighter person is using the vehicle the apertures 42 are fully open and when a heavier person uses the vehicle the apertures can be restricted to restrict the flow of fluid therethrough.

The vent 20 is provided so that when the operator leaves the seat the spring 32 can return the piston to its uppermost position.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A tractor seat comprising a base adapted to be secured to a tractor, a vertically disposed cylinder having a bottom secured to said base, a piston within the cylinder having a central opening and solid around said opening and having a tubular stem extending longitudinally upward through the upper end of the cylinder and opening downward through the opening in the piston, a hollow bracket supported on the upper end of the stem, a seat supported on the bracket, a spring disposed in said cylinder between the lower end thereof and said piston and seated on the bottom of the cylinder, said cylinder containing a fluid above and below said piston, said piston stem having apertures therein adjacent said piston, and adjustable means in said stem for restricting said apertures to vary the rate of flow of fluid therethrough, said adjustable means comprising a valve slidably disposed in said hollow stem adjacent said apertures, a rod secured to the valve and extending upwardly in said stem, an abutment on the upper end of said rod threaded into the upper end of said stem and in said bracket and extending upwardly into the bracket.

References Cited in the file of this patent

UNITED STATES PATENTS

| 1,562,879 | Flentje | Nov. 24, 1925 |
| 2,526,552 | Gillespie | Oct. 17, 1950 |

FOREIGN PATENTS

| 275,367 | Germany | Aug. 1, 1951 |